United States Patent [19]

Ott

[11] 4,352,688

[45] Oct. 5, 1982

[54] NITROGEN FERTILIZERS

[75] Inventor: Louis E. Ott, Oswego, Ill.

[73] Assignee: Standard Oil Company (Indiana), Chicago, Ill.

[21] Appl. No.: 956,913

[22] Filed: Nov. 2, 1978

[51] Int. Cl.$^3$ .............................................. C05G 3/00
[52] U.S. Cl. ............................................ 71/11; 71/51; 71/55; 71/54; 71/59; 71/63
[58] Field of Search ................. 71/28, 34, 55, 54, 59, 71/61, 64 C, 11, 51, 63, 64, 10, 902

[56] References Cited

U.S. PATENT DOCUMENTS

| | | | |
|---|---|---|---|
| 2,017,711 | 10/1935 | Demontis | 71/11 |
| 2,953,449 | 9/1960 | Seifter et al. | 71/11 |
| 3,854,923 | 12/1974 | Ott | 71/64 C |
| 4,007,029 | 2/1977 | Kenton | 71/64 C |

OTHER PUBLICATIONS

"Fertilizer Technology & Use" Soil Science Society of America Inc., 1971, pp. 438-439.

Primary Examiner—William F. Smith
Attorney, Agent, or Firm—Richard A. Kretchmer; William T. McClain; William H. Magidson

[57] ABSTRACT

Low molecular weight alkanoic acids and alkanoate anions thereof, particularly acetic acid and acetate ion, are effective in enhancing the ability of nitrogen fertilizers to promote plant growth and productivity.

8 Claims, No Drawings

NITROGEN FERTILIZERS

BACKGROUND OF THE INVENTION

1. Field of the Invention

This invention relates to liquid and solid nitrogen fertilizers. More particularly, it relates to the use of low molecular weight alkanoic acids and alkanoate anions thereof to enhance the effect of nitrogen fertilizers in promoting the growth and productivity of plants.

2. Description of the Prior Art

Plants require a variety of materials for adequate nutrition. The principal materials are carbon dioxide and water, which provide the elements of carbon, hydrogen and oxygen, and which are usually available in adequate amounts from both soil and atmosphere. The supply of carbon dioxide and water is continually replenished by natural phenomena. All the other essential nutrients are normally available from the soil, but they are not replenished by nature after the plant takes them up into its foliage and fruit. When the plant is removed from the soil for consumption, in contrast to the natural cycle of return to the soil, the soil nutrient supply is reduced, and the application of fertilizer becomes necessary in time.

Thirteen elements, which are normally drawn from the soil, are currently known to be essential to plant nutrition. These elements consist of nitrogen, phosphorus, potassium, calcium, magnesium, sulfur, iron, manganese, copper, zinc, boron, molybdenum and chlorine. Of these thirteen elements, nitrogen, phosphorus and potassium are needed by the plant in relatively large quantities and are therefore called macronutrients. Calcium, magnesium, and sulfur are generally required in lesser but still substantial amounts and are classified as secondary nutrients. The remaining members of the group are known as micronutrients since they are required in very small amounts for plant growth.

Although carbon, hydrogen, and oxygen are known to be essential elements for plant growth and development, organic matter which contains only these elements is not generally recognized as having any direct role in plant nutrition. The soil organic matter, or humus, is known only to be of importance relative to soil texture and structure, serving to determine the reaction of the soil to air supply, water supply and retention of available nutrients. Except for nitrogen containing compounds such as urea, and a variety of chelating agents such as citric acid, specific organic compounds do not appear to have been suggested for use in the improvement of plant nutrition. The role of these chelating agents is to solubilize and maintain metals in a form which can be utilized by growing plants.

U.S. Pat. Nos. 3,909,229; 3,997,319; and 3,854,923 are directed to a micronutrient composition consisting of a solution in anhydrous or aqueous ammonia of a zinc alkanoate which contains from 1 to 6 carbon atoms, and zinc acetate is identified as being a suitable zinc alkanoate. These patents teach that the zinc salts of low molecular weight alkanoic acids are desirable sources of zinc for use in combination with ammonia as a consequence of their relatively high solubility in aqueous or anhydrous ammonia. These patents do not, however, suggest the possibility that low molecular weight alkanoic acids and alkanoate anions thereof could have any desirable effect on plant nutrition which is independent of the presence or absence of zinc.

Similarly, U.S. Pat. No. 4,007,029 discloses the preparation and use of a liquid fertilizer composition which comprises anhydrous ammonia, at least one trace element selected from the group consisting of boron, copper, magnesium, manganese and molybdenum, and wherein a compound such as ammonium acetate, magnesium acetate or sodium acetate may be used to solubilize the trace element. This patent fails to suggest that acetate anion could have any desirable effect on plant nutrition which is independent of a trace element.

SUMMARY OF THE INVENTION

It has been discovered that a minor amount of at least one alkanoic acid or alkanoate anion thereof can be applied to the soil in combination with a source of available nitrogen to improve the ability of the nitrogen source to enhance plant growth and productivity. Accordingly, it is an object of this invention to provide an improved fertilizer composition and an improved method of fertilizing agricultural soil. Other objects, aspects and advantages of the invention will be readily apparent from the following description and claims.

DETAILED DESCRIPTION OF THE INVENTION

The alkanoic acids of this invention have the formula RCOOH wherein R is alkyl. These acids preferably contain from 2 to 6 carbon atoms and suitable acids include acetic, propanoic, butanoic and hexanoic acids with acetic acid being particularly preferred as a consequence of its availability and relative low cost. The alkanoate anions derived from these acids, having the formula RCOO, are also suitable for use in the practice of this invention. The alkanoate anions can be used in the form of an ammonium or metal salt wherein the metal is any agriculturally acceptable metal. The metal is desirably selected from Groups IA-IIIA, IB, IIIB-VIIB and VIII of the Periodic Table of Elements, and the metal is desirably selected from the group consisting of lithium, sodium, potassium and calcium. Ammonium acetate is highly preferred for use in the practice of the invention because of its availability and ease of application.

In the case of an ammonium alkanoate, the ammonium ion of the salt additionally serves as a minor source of available nitrogen. This invention, however, involves the discovery that the concentration of alkanoate anion can be adjusted so as to substantially enhance the effect of a source of available nitrogen in a manner which cannot be explained by the mere presence of an associated ammonium cation as a minor additional source of nitrogen. Similarly, although the metal of a metal alkanoate may, in some cases, function of itself as a nutrient, this invention involves the discovery that the concentration of alkanoate anion can be adjusted independently of such metal concentration so as to enhance the effect of a nitrogen source in promoting plant growth and productivity.

The source of available nitrogen employed in this invention can be any material which is capable of releasing nitrogen in the soil in such a manner that it can be utilized by plants for growth. The nitrogen source can be suitably selected from the group consisting of ammonia, ammonium salts, urea, nitrate salts, calcium cyanamide, and mixtures thereof. Desirably, the nitrogen source is selected from the group consisting of ammonia, ammonium nitrate, ammonium sulfate, sodium nitrate, calcium nitrate, calcium cyanamide, urea, ammonium phosphate, ammonium polyphosphate and mixtures thereof. Preferably, the nitrogen source is ammonia, which can be utilized either as an aqueous solution or as a substantially anhydrous liquid.

The alkanoic acid or alkanoate anion of this invention is utilized in a minor amount relative to the amount of said source of available nitrogen, which is effective to enhance the ability of the nitrogen source to promote plant growth and productivity. The enhanced response of plants to the nitrogen source diminishes in magnitude as the mole ratio of nitrogen source to alkanoic acid and/or alkanoate anion increases or decreases beyond an optimum value. When the nitrogen source is selected from the group consisting of ammonia, ammonium nitrate, ammonium sulfate, sodium nitrate, calcium nitrate, calcium cyanamide, urea, ammonium phosphate, ammonium polyphosphate and mixtures thereof, the mole ratio of nitrogen source to alkanoic acid and/or alkanoate anion is desirably from about 50 to about 50,000, preferably from about 600 to about 50,000 and more preferably from about 900 to about 20,000.

The source of available nitrogen and alkanoate salt can be applied to the soil either separately or concurrently. Preferably these materials are mixed and simultaneously applied to the soil since this requires only a single operation. Ordinarily, the source of available nitrogen and alkanoic acid can also be applied to the soil either separately or concurrently. In some cases, however, the desired nitrogen source may react chemically with the alkanoic acid, such as ammonia which will afford the ammonium salt of the acid. In such cases, the alkanoic acid and nitrogen source are separately applied to the soil. The nitrogen source and alkanoic acid or alkanoate salt can be applied to the soil in solid, liquid or solution form by conventional techniques. For example, solids can be applied by broadcasting while liquids and solutions can be applied by spraying or by injection below the surface of the soil.

A preferred embodiment of the invention comprises fertilizing agricultural soil with a solution of ammonium acetate in substantially anhydrous liquid ammonia. Such a solution desirably contains from about 0.005 to about 10 weight percent ammonium acetate, preferably from about 0.01 to about 2 weight percent ammonium acetate, and more preferably from about 0.01 to about 0.5 weight percent ammonium acetate. Such a solution is applied to the soil in an amount effective to promote plant growth and productivity. No special equipment is required for application of the solution to the soil other than a tank, metering device and ammonia injector of the type conventionally employed for application of anhydrous ammonia below the surface of the soil.

Commercial grade anhydrous liquid ammonia generally contains about 0.5 weight percent of water and, as used herein, the term "substantially anhydrous liquid ammonia" refers to liquid ammonia containing up to about 5 weight percent water.

Preferred compositions for use in the practice of the invention comprise solutions which contain from about 93 to about 99.99 weight percent ammonia, about 0.01 to about 2 weight percent ammonium acetate, and from about 0 to about 5 weight percent water. More preferably, the compositions comprise solutions which contain from about 95 to about 99.99 weight percent ammonia, about 0.01 to about 0.5 weight percent ammonium acetate, and from about 0 to about 5 weight percent water. These preferred compositions are conveniently prepared in the field by dilution with anhydrous liquid ammonia of a concentrated ammonium acetate stock solution which contains about 5 to about 10 weight percent ammonia, about 20 to about 50 weight percent ammonium acetate, and about 40 to about 75 weight percent water. Such a stock solution can be easily handled at ambient temperatures without any need for pressure equipment.

The precise mechanism by which the alkanoic acid and/or alkanoate anion thereof assists plants in utilizing a source of nitrogen is unknown. The alkanoic acid and/or alkanoate anion may function directly as a plant nutrient. Alternatively, the alkanoic acid and/or alkanoate anion may play a role in the process by which nitrogen is extracted from the soil and utilized by a plant. Minor amounts of alkanoic acid and/or alkanoate anion, relative to a nitrogen source, unexpectedly enhance the response of plants to the nitrogen source. At large concentrations of alkanoic acid and/or alkanoate anion, this synergism appears to diminish, however.

The following examples are intended only to illustrate the invention and are not to be construed as imposing limitations on the invention.

EXAMPLE I

A stock solution of ammonium acetate in aqueous ammonia was prepared by mixing 33.6 parts of glacial acetic acid with 48.0 parts of water followed by slow addition to the cooled mixture of 18.4 parts of commercial anhydrous liquid ammonia while maintaining the temperature between 25° and 50° C. The resulting solution, containing 0.93 moles of ammonia per mole of ammonium acetate, had a pH of 10.92 and a specific gravity of 1.026.

EXAMPLE II

A solution of ammonium acetate in aqueous ammonia was prepared by mixing 33.6 parts of glacial acetic acid with 26.2 parts of water followed by slow addition to the cooled mixture of 18.4 parts of commercial anhydrous liquid ammonia while maintaining the temperature between 10° and 50° C. After cooling the solution to 10° C., 21.8 parts of zinc oxide were slowly added with stirring while maintaining the temperature below 25° C. The zinc oxide dissolved rapidly to afford a stock solution ontaining 17.5 weight percent zinc which had a pH of 11.4 and a specific gravity of 1.270.

EXAMPLE III

A fertilizer solution was prepared by diluting 0.52 pounds of the stock solution of Example I with 183 pounds of commecial anhydrous liquid ammonia. The resulting fertilizer solution had a mole ratio of ammonia to acetate ion of 3,700 and contained 0.224 pounds (0.122 weight percent) of ammonium acetate.

EXAMPLE IV

A fertilizer solution was prepared by diluting 0.26 pounds of the stock solution of Example II with 183 pounds of commercial anhydrous liquid ammonia. The resulting fertilizer solution had a mole ratio of ammonia to acetate ion of 7,400 and contained 0.046 pounds (0.025 weight percent) of zinc.

EXAMPLE V

The concentrated stock solution of Example I or Example II was diluted with sufficient commercial anhydrous ammonia to give fertilizer compositions which were used to deliver the per acre amounts of ammonia and acetate which are set forth in Tables I and II. The proper amount of stock solution was weighed and added to an empty pressure vessel which was fitted with a liquid withdrawal valve and several vapor valves. The amount of commercial anhydrous liquid ammonia necessary to give the desired concentrations of acetate ion was then weighed into the vessel. The resulting fertilizer composition was withdrawn from the vessel through a flow meter and injected into the soil with a conventional ammonia applicator drawn by a farm tractor. Tables I and II also set forth the results which were obtained through the use of these fertilizer compositions on corn crops.

TABLE I

| | | Treatment $Zn(NH_3)_4(C_2H_3O_2)_2$ | | |
|---|---|---|---|---|
| $NH_3$, lb./acre | $NH_4(C_2H_3O_2)$, lb./acre | Zn, lb./acre | Equivalent Amount of $NH_4(C_2H_3O_2)$,[a] lb./acre | Yield, bu./acre |
| 0 | 0 | 0 | | 83.2 |
| 98 | 0 | 0 | | 153 |
| 98 | 0 | 0.024 | 0.06 | 156 |
| 98 | 0 | 0.049 | 0.12 | 165 |
| 98 | 0.12 | 0 | | 165 |
| 195 | 0 | 0 | | 168 |
| 195 | 0 | 0.049 | 0.12 | 173 |
| 195 | 0 | 0.098 | 0.24 | 177 |
| 195 | 0.24 | 0 | | 177 |
| 293 | 0 | 0 | | 176 |
| 293 | 0 | 0.073 | 0.18 | 180 |
| 293 | 0 | 0.146 | 0.36 | 178 |
| 293 | 0.36 | 0 | | 179 |

[a]Calculated amount of $NH_4(C_2H_3O_2)$ required to provide the same amount of acetate ion as provided by the $Zn(NH_3)_4(C_2H_3O_2)_2$.

TABLE II

| | | Treatment $Zn(NH_3)_4(C_2H_3O_2)_2$ | | Yield | |
|---|---|---|---|---|---|
| $NH_3$, lb./acre | $NH_4(C_2H_3O_2)$, lb./acre | Zn, lb./acre | Equivalent Amount of $NH_4(C_2H_3O_2)$,[a] lb./acre | Grain, bu./acre | Silage, ton/acre |
| 0 | 0 | 0 | | 105 | 23.4 |
| 183 | 0 | 0 | | 144 | 25.8 |
| 183 | 0 | 0.046 | 0.112 | 158 | 28.6 |
| 183 | 0 | 0.091 | 0.224 | 162 | 29.0 |
| 183 | 0.224 | 0 | | 161 | 30.4 |
| 183 | 0 | 0.182 | 0.449 | 163 | 28.7 |
| 183 | 0.449 | 0 | | 156 | 28.3 |
| 183 | 0 | 0.364 | 0.897 | 154 | 27.7 |
| 183 | 0.897 | 0 | | 147 | 29.3 |

[a]Calculated amount of $NH_4(C_2H_3O_2)$ required to provide the same amount of acetate ion as provided by the $Zn(NH_3)_4(C_2H_3O_2)_2$.

The test results of Tables I and II demonstrate that acetate in the form of ammonium acetate is as effective as acetate in the form of zincammine acetate in promoting the response of corn to fertilization with anhydrous ammonia. The results show that the additional presence of zinc, which is a known micronutrient, has little if any effect in promoting an increased plant response to fertilization with ammonia.

The results tabulated in Table I demonstrate that the corn yield from a per acre application of 98 pounds of ammonia in combination with 0.12 pounds of ammonium acetate is about equivalent to 195 pounds of ammonia without acetate. Similarly, a per acre application of 195 pounds of ammonia in combination with 0.24 pounds of ammonium acetate affords results comparable to an application of 293 pounds per acre of ammonia without acetate.

The results which are set forth in Table II demonstrate that acetate in combination with ammonia is effective in promoting the yield of both grain and silage from corn. These results further indicate that the enhanced plant response to ammonia begins to diminish in magnitude as the ratio of acetate to ammonia increases beyond an optimum amount.

I claim:

1. A method of fertilizing soil consisting of applying an effective amount of ammonia and ammonium acetate to said soil, wherein the mole ratio of ammonia to acetate ion is from about 50 to about 50,000.

2. The method as set forth in claim 1 wherein the mole ratio of ammonia to acetate ion is from about 600 to about 50,000.

3. The method as set forth in claim 1 wherein said ammonia is substantially anhydrous liquid ammonia.

4. A method of fertilizing soil which comprises applying below the surface of said soil an effective amount of a solution consisting of from about 0.005 to about 10 weight percent of ammonium acetate in substantially anhydrous liquid ammonia.

5. The method as set forth in claim 4 wherein said solution contains from about 0.01 to about 2 weight percent of ammonium acetate.

6. A liquid fertilizer composition consisting of from about 93 to 99.99 weight percent ammonia, about 0.01 to about 2 weight percent ammonium acetate, and about 0 to about 5 weight percent water.

7. A method of treating soil which comprises applying to said soil a source of available nitrogen and at least one alkanoate anion in the form of a salt which is selected from the group consisting of the ammonium and metal salts of an alkanoic acid containing from 2 to 6 carbon atoms; wherein said metal is selected from the group consisting of lithium, sodium, potassium and calcium; said nitrogen source is selected from the group consisting of ammonium nitrate, ammonium sulfate, sodium nitrate, calcium nitrate, calcium cyanamide, urea, ammonium phosphate, ammonium polyphosphate and mixtures thereof; and the mole ratio of said nitrogen source to said alkanoate anion is from about 600 to about 50,000.

8. A method of treating soil which comprises applying to the soil a source of available nitrogen and a minor amount of at least one alkanoic acid containing from 2 to 6 carbon atoms wherein the amount of said alkanoic acid is effective to enhance the ability of said source of available nitrogen to promote plant growth and productivity; and said source of available nitrogen is selected from the group consisting of ammonium nitrate, ammonium sulfate, sodium nitrate, calcium nitrate, calcium cyanamide, urea, ammonium phosphate, ammonium polyphosphate and mixtures thereof.

* * * * *